Figure 1:
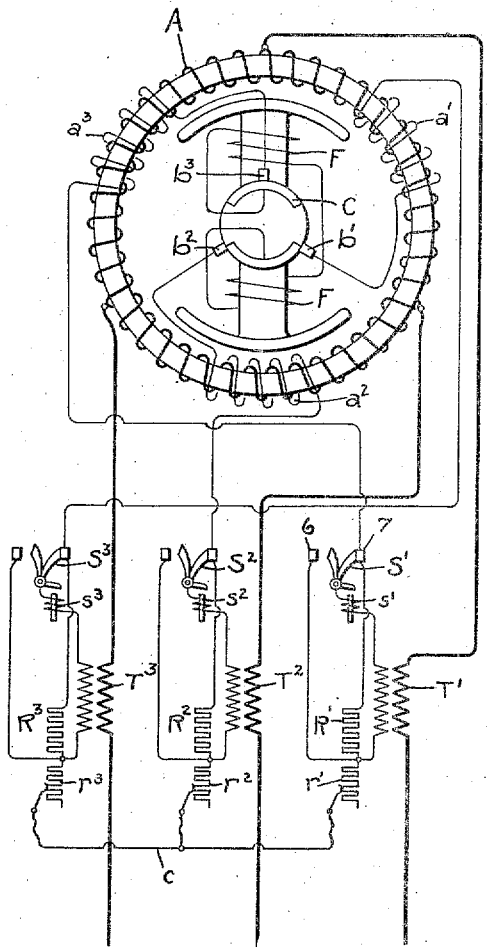

E. F. W. ALEXANDERSON.
OVERLOAD PROTECTIVE DEVICE.
APPLICATION FILED MAY 15, 1905.

954,845.

Patented Apr. 12, 1910.
2 SHEETS—SHEET 1.

WITNESSES
Lloyd C. Bush
Green Oxford

INVENTOR.
Ernst F. W. Alexanderson
By Albert G. Davis
Atty.

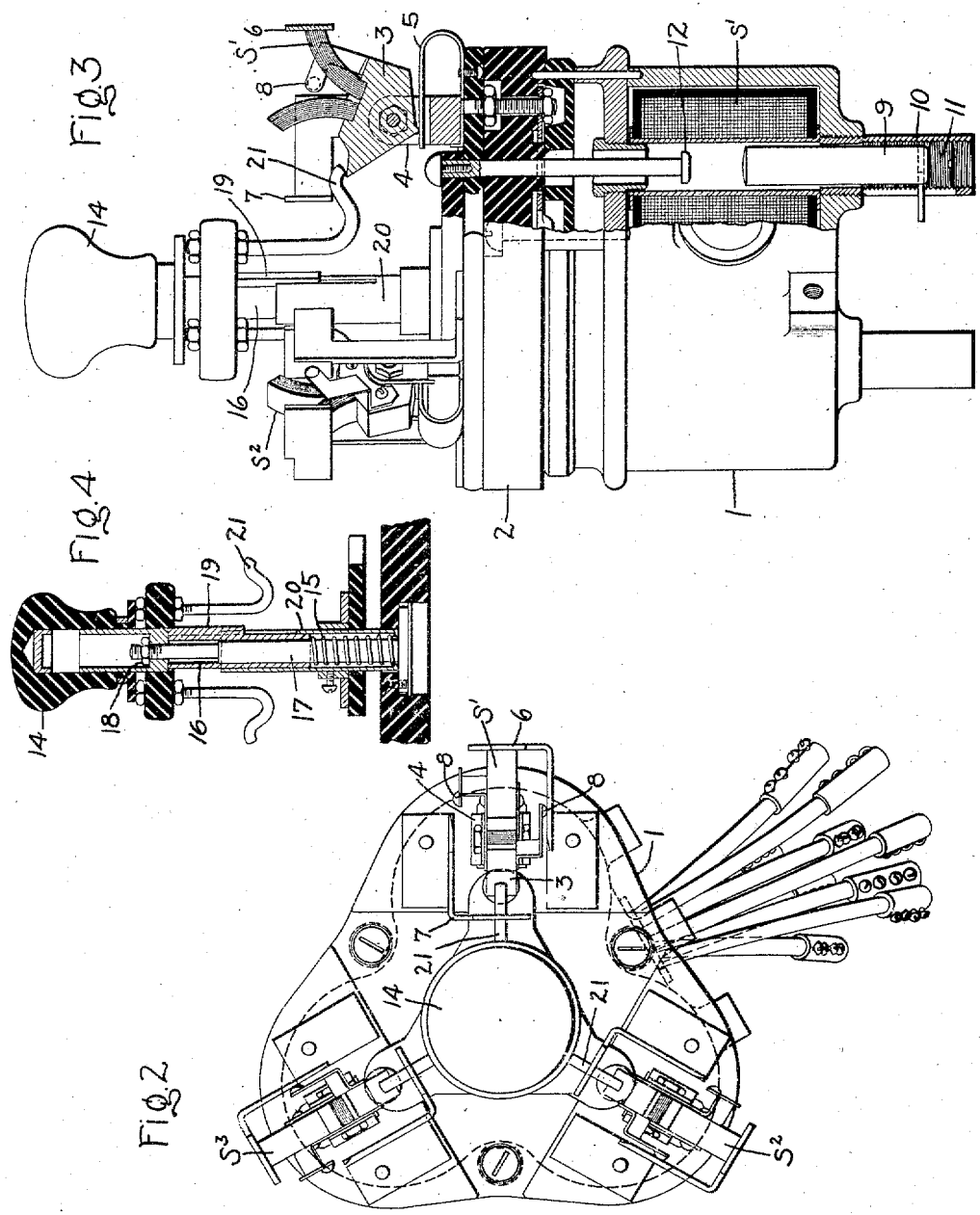

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

OVERLOAD PROTECTIVE DEVICE.

954,845.

Specification of Letters Patent. Patented Apr. 12, 1910.

Application filed May 15, 1905. Serial No. 260,426.

*To all whom it may concern:*

Be it known that I, ERNST F. W. ALEXANDERSON, a subject of the King of Norway and Sweden, residing in Schenectady, county of Schenectady, and State of New York, have invented certain new and useful Improvements in Overload Protective Devices, of which the following is a specification.

My invention relates to overload protective devices for compound, self-exciting, alternating-current generators.

In its broadest aspect, my invention is applicable to any self-exciting, alternating-current generator provided with compounding means such as series transformers, but in certain of its features my invention refers particularly to an alternating-current generator compounded in the manner disclosed in a former patent, No. 789,476, issued to me May 9, 1905, in which a resistance is placed in series with the shunt excitation, and the secondary of the compounding series transformer is connected in shunt to the resistance.

In its broadest aspect, my invention consists of a protective device adapted upon an overload to cut the compounding means out of circuit, as by short-circuiting the series transformer supplying the compounding excitation for the generator. Since a self-exciting compound alternating-current generator can carry only a small portion of its full load when operating as a shunt machine, owing to the large armature reaction which is present in alternating-current machines, cutting out the compounding means is as effective in protecting the generator from an overload as opening the circuit would be; since as soon as the compounding means is cut out, the current immediately falls to zero, so that no damage to the generator can possibly occur. The reason for this appears from the following considerations. For a self-excited shunt machine there exists a critical load on which the machine cannot build up or keep its excitation. For D. C. shunt machines this critical load is far beyond a reasonable overload but for alternators it may be inside the normal load. The machine will therefore lose its voltage and current completely until the overload has been removed. Thus, by the use of a simple and inexpensive device, it is rendered unnecessary to provide such generators with switches adapted to open the generator circuit upon a large overload.

As has been stated above, in some of its features my invention refers particularly to the protection of a generator compounded as disclosed in my former patent, that is, with a resistance connected in series with the shunt excitation, and a compounding transformer connected in shunt to the resistance. In its application to such an arrangement of compounding, my invention comprises the additional feature of disconnecting one or both terminals of the series transformer from the resistance, when short-circuiting the transformer upon itself, and leaving the resistance in series with the shunt excitation. This resistance left in series with the shunt excitation, reduces the load which the generator can carry when the series transformer is cut out to a point that is lower than would be the case if resistance and series transformer were both short-circuited.

My invention comprises a number of other features, which will appear from the following specification and accompanying drawings, and which will be more specifically pointed out in the appended claims.

My invention will best be understood by reference to the accompanying drawings, in which—

Figure 1 shows diagrammatically the connections of an overload protective device arranged in accordance with my invention and applied to a generator compounded in a manner disclosed in my former patent above referred to; Fig. 2 shows a plan view of a protective device arranged in accordance with my invention and adapted for protection of a three-phase generator; Fig. 3 shows a side elevation of the same partly in cross-section; and Fig. 4 shows a cross-sectional detail.

Referring first to Fig. 1, A represents the armature of an alternating-current generator. This winding is shown as a three-phase, bipolar, Gramme-ring, winding, but it will, of course, be understood that my invention is applicable to a machine having any number of phases and of poles, and any well-known form of armature winding.

F F represent the field coils, which are connected to the segments of a commutator C, on which bear a three-phase arrangement of brushes $b^1$, $b^2$ and $b^3$. The arrangement of commutator and brushes here illustrated is fully disclosed in my former patent No. 789,476, above referred to. To describe it briefly, it consists of a commutator having as many segments as the machine has poles, with a polyphase arrangement of brushes bearing thereon and connected to a polyphase source of excitation, as will be hereinafter explained. The commutator segments have a length substantially equal to the distance between adjacent brushes, so that as a segment leaves one brush, it engages with another. If a three-phase current is supplied to brushes displaced from each other 120 electrical degrees, a direct current will be supplied to the field winding. The brushes are connected to any suitable source of shunt excitation, in this case the source being indicated by an auxiliary three-phase winding $a^1$, $a^2$ and $a^3$ carried by the armature. One terminal of each phase of the auxiliary winding is connected to a commutator brush, while the other terminal is connected through resistances $R^1$ and $r^1$, etc., to a common conductor $c$. That is, the three phases are shown connected in Y.

$T^1$, $T^2$ and $T^3$ represent three series transformers, the primaries of which are connected respectively in series with the main armature leads. The secondaries of these transformers are connected across the resistances $R^1$, $R^2$ and $R^3$ through three switches or switch contacts $S^1$, $S^2$ and $S^3$ and through their actuating coils $s^1$, $s^2$ and $s^3$, respectively. With the series transformers thus connected, the current flowing from the transformer secondaries through the resistances $R^1$, $R^2$ and $R^3$ is proportional to the current in the main leads, and consequently the voltage across the terminals of these resistances due to this current flow is proportional to the main armature current. Thus, if the transformer secondaries are properly connected, a potential will be added to the shunt excitation, due to the auxiliary exciting winding $a^1$, $a^2$ and $a^3$, proportional to the main armature current. In other words, the proper compounding is obtained. It will be noticed that the series transformers are so connected relatively to the phases of the auxiliary exciting winding that the compounding potential added by the series transformers to the shunt excitation is at right angles to the shunt excitation. This arrangement is for the purpose of obtaining the proper compounding for inductive loads, as is fully explained in my patent above referred to. The resistances $r^1$, $r^2$ and $r^3$ are shown variable for the purpose of adjusting the excitation of the machine in the usual manner.

The connections shown in Fig. 1 are maintained as long as the machine is operating under normal conditions. If, however, an overload should occur, the current in the secondary circuits of the series transformers would increase so as to actuate one or all of the magnet coils $s^1$, $s^2$ and $s^3$, which would thereupon operate, as will be hereinafter explained, to shift the switches $S^1$, $S^2$ and $S^3$ to the opposite contacts. This movement of the switches disconnects one terminal of the secondaries of the series transforms from the resistances $R^1$, $R^2$ and $R^3$, and short-circuits the transformers upon themselves. Consequently, not only is the compounding effect of the series transformers removed from the field circuit of the generator but, furthermore, the resistances $R^1$, $R^2$ and $R^3$ are left in series with the source of shunt excitation, so that the resistance of the exciting circuit is left unchanged, and the overload is beyond the critical load of the shunt machine. The armature current consequently falls to zero and the machine is as fully protected against damage from an overload as though its armature circuit had been completely broken; and thus protection is obtained by means of switch contacts which may be simple and inexpensive, since the power controlled by them is at all times comparatively small.

I have described the circuit connections for a system of compounding arranged in accordance with my former patent. Obviously, my invention is applicable to any other arrangement of compounding in which series transformers are employed. In every case it is necessary only to connect the switch contacts so that when operated they will short-circuit the series transformers.

A suitable construction of protective device arranged in accordance with my invention is shown in Figs. 2, 3 and 4. In these figures 1 represents a suitable casing, preferably of magnetic material inclosing the actuating coils for the switch contacts. One of these coils $s^1$ is shown in cross-section in Fig. 3. The casing 1 is provided with a suitable insulating cover 2, on which are mounted the switch contacts $S^1$, $S^2$ and $S^3$. These contacts consist of laminated brushes carried by a block 3 pivoted on suitable supports 4. The block 3 is pointed at its lower end and bears against a spring 5, which presses upwardly on the pointed end of the block. With this construction, if the switch contact is moved in either direction past its mid-position, the spring 5 tends to press it forward to complete its movement, with a snap action, and to hold it in its extreme position. In its two extreme positions, the switch contact engages the stationary contact 6 and the stationary contact 7, respectively. When in engagement with contact 6, the series transformer is short-circuited, as shown in Fig. 1, while the normal position of the switch is in engagement with contact 7. The switch is provided with two small auxiliary contacts 8, which are so arranged that when the switch contact is moved from one position to the other, one contact 8 engages one of the stationary contacts 6 or 7 before the other contact 8 leaves the other stationary contact. This arrangement is for the purpose of preventing an open-circuiting of the secondaries of the series transformers. The transformer is short-circuited before its connection with the resistance is broken. The final break is made by the auxiliary contacts 8.

For operating the switch contact $S^1$ automatically, the magnet coil $s^1$ is provided with a suitable core or plunger 9 carried inside a hollow tube 10 and supported adjustably by a screw 11 engaging a screw-thread on the inner surface of the tube 10. When an overload occurs and the coil $s^1$ draws up the plunger 9, it strikes the lower end of a spindle 12, which is thereby raised so as to strike the pivoted block 3 with a hammer-blow and force it over to the position shown in Figs. 2 and 3. The series transformer is thus short-circuited in the manner heretofore described. It will be seen that one or all of the switch contacts may be actuated at a single time, according as the overload comes upon one phase or all the phases, since each switch contact is provided with its own actuating coil.

In order to reset the switch contacts after they have once been shifted by their actuating coils, I provide a suitable insulating handle 14 carried by a hollow tube 16, which slides on a spindle 17, and is normally held raised against an adjustable nut 18 by the spiral spring 15. The lower part of the tube 16 moves in a hollow tube 20, and is provided with a tongue 19, which moves in a slot in tube 20, and serves as a guide to prevent the handle from twisting. The handle carries three hooks 21, which, when the handle is depressed, are adapted to engage the blocks 3 of the switch contacts and rock the blocks on their pivots so as to shift the switch contacts into engagement with the stationary contact 7. Thus, by a single movement of the handle, all the switch contacts that have been tripped, whether one or all of them, are reset. When the handle is released it is returned to the position shown by the spring 15.

I do not desire to limit myself to the particular construction and arrangement of parts here shown, but aim in the appended claims to cover all modifications which are within the scope of my invention.

What I claim as new, and desire to secure by Letters Patent of the United States, is,—

1. In combination with a self-exciting alternating-current generator having a field winding provided with a rectifying commutator, a source of shunt excitation connected to said commutator, a resistance in series with said source, a transformer having its primary connected in series with the armature of said generator and its secondary in shunt to said resistance, and automatic means for short-circuiting said transformer and disconnecting it from said resistance when the armature current of the generator exceeds a predetermined amount.

2. In combination with a self-exciting alternating-current generator having a field winding provided with a rectifying commutator, a source of shunt excitation connected to said commutator, a resistance in series with said source, a transformer having its primary connected in series with the armature of said generator and its secondary in shunt to said resistance, a magnet winding in series with one of the windings of said transformer, and a switch controlled by said magnet winding and adapted to short-circuit said transformer and to disconnect it from said resistance.

3. In combination with a self-exciting alternating-current generator having a field winding provided with a rectifying commutator and an auxiliary exciting winding carried by the armature and connected to said commutator, a resistance in series with said exciting winding, a series transformer having its primary connected in series with the armature winding and its secondary in shunt to said resistance, a magnet winding in series with said secondary, and a switch controlled by said magnet winding and adapted to short-circuit said transformer and to disconnect it from said resistance.

4. In a protective device for a polyphase circuit, a plurality of magnet windings supplied with current from the several phases of said circuit, independent switches controlled by said magnet windings and controlling said circuit, a single handle arranged to reset said switches simultaneously, and a spring normally holding said handle out of engagement with said switches.

5. In combination, a resistance, a series transformer having its secondary winding in shunt to said resistance, and a switch having its contacts so constructed and arranged that in its movement it first short-circuits said secondary, then disconnects it from said resistance without breaking the short-circuit, and maintains the short-circuit.

6. In combination, a resistance, a series transformer having its secondary connected in shunt to said resistance, an overload magnet winding in series with said secondary, and a switch controlled by said magnet winding and adapted by its movement first to short-circuit said secondary and then to disconnect it from said resistance.

In witness whereof, I have hereunto set my hand this 12th day of May, 1905.

ERNST F. W. ALEXANDERSON.

Witnesses:
BENJAMIN B. HULL,
HELEN ORFORD.